(12) United States Patent
Miyazaki

(10) Patent No.: US 7,172,381 B2
(45) Date of Patent: Feb. 6, 2007

(54) UNFASTENING PREVENTION DEVICE

(75) Inventor: Satoshi Miyazaki, 8-27-704, Kamikita 8-chome, Hirano-ku, Osaka-shi, Osaka (JP) 547-001

(73) Assignees: Nishioka Byoura Co., Ltd., Higashiosaka (JP); Satoshi Miyazaki, Osaka (JP)

( * ) Notice: Subject to any disclaimer, the term of this patent is extended or adjusted under 35 U.S.C. 154(b) by 0 days.

(21) Appl. No.: 10/540,626

(22) PCT Filed: Dec. 26, 2002

(86) PCT No.: PCT/JP02/13579

§ 371 (c)(1),
(2), (4) Date: Jun. 24, 2005

(87) PCT Pub. No.: WO2004/061316

PCT Pub. Date: Jul. 22, 2004

(65) Prior Publication Data

US 2006/0120825 A1 Jun. 8, 2006

(51) Int. Cl.
*F16B 37/14* (2006.01)

(52) U.S. Cl. .............. 411/372.6; 411/429; 411/910

(58) Field of Classification Search ............ 411/910, 411/429, 421, 373, 372.5, 372, 372.6
See application file for complete search history.

(56) References Cited

U.S. PATENT DOCUMENTS

| | | | | |
|---|---|---|---|---|
| 1,451,476 A | * | 4/1923 | Schieber ............... 200/535 |
| 3,333,439 A | * | 8/1967 | Bessette .................. 464/177 |
| 4,427,326 A | * | 1/1984 | Hobson et al. ............. 411/5 |
| 5,730,567 A | * | 3/1998 | Haseley et al. .......... 411/403 |
| 5,749,690 A | * | 5/1998 | Kutz ....................... 411/431 |
| 5,752,795 A | * | 5/1998 | D'Adamo ................ 411/429 |
| 6,142,579 A | * | 11/2000 | Thiel .................. 301/37.374 |

FOREIGN PATENT DOCUMENTS

| | | |
|---|---|---|
| JP | 2001-330020 A | 11/2000 |
| JP | 2002-039146 A | 2/2002 |

\* cited by examiner

*Primary Examiner*—Flemming Saether
(74) *Attorney, Agent, or Firm*—Crowell & Moring LLP

(57) ABSTRACT

An object of the present invention is to provide an unfastening prevention device which has nothing projecting outside, and can prevent unfastening at either head or distal end of a bolt.

An unfastening prevention is attained by covering a cap (6, 16) to screwed up fastening means formed of a bolt (2) and a nut (3). In a groove (6a, 16a) formed on an inner surface of the cap (6, 16) an outer periphery of a spring ring (8) is engaged, an inner periphery of the spring ring being engaged in a groove (7a) of a holder (7), restricting axial direction (2a) and resulting in slip out prevention. Even when a torque is given on the cap (6, 16), the cap idles, fastening condition does not change and unfastening prevention is attained.

3 Claims, 4 Drawing Sheets

(a)

(b)

UNFASTENING PREVENTION DEVICE

TECHNICAL FIELD

This invention relates to an unfastening prevention device for fastening means once screwed up by bolts and nuts etc.

BACKGROUND ART

Conventionally, fastening by bolts and nuts is widely known in mechanical fastening places such as fastening of a number plate to a bumper of automobiles, fastening of a pole base plate to anchor nuts or anchor bolts, fastening in construction sites of iron towers or buildings and fastening parts to railroads or some structures. According to screw up fastenings, it is easy to increase or decrease the fastening rigidity by adjusting fastening torque and it is also possible to readjust the fastening rigidity after the fastening process has been completed if necessary. General tools such as spanners may be utilized to screw up or release bolts and nuts for transmitting torque, and large fastening rigidity can be easily obtained by applying relatively small torque. On the fastened places, various proposed unfastening means may be applied to keep the fastened condition long.

But recently, crimes such as breaking fastening places of number plates, iron towers for power transmission lines and connecting places of rail roads are committed by somebody unknown. Fastening places using bolts and nuts are possible to keep stable and long lasting fastened state by applying appropriate unfastening prevention means. But it is not possible to prevent some body with malicious intent break and loosen fastening means using general tools.

The present applicant has proposed unfastening prevention devices each of which is covered on a fastened place of bolt and nut and is not released by general tools in patent application 2000-148383 (patent publication KOKAI 2001-330020) and patent application 2000-218455 (patent publication KOKAI 2002-39146). In the former patent application 2000-148383, a cylindrical cover member is fixed on a shank of a bolt by a pin. In the patent application 2000-218455, a cover member is fixed on a distal bolt shank projecting from a nut.

But according to the patent application 2000-148383, the pin projects out of the cover member. According to the patent application 2000-218455, it is only applicable at distal end of the bolt shank, and it is not possible to prevent unfastening at head of the bolt.

SUMMARY OF THE INVENTION (Technical Problem to be solved by the Invention)

An object of the present invention is to provide an unfastening prevention device which has nothing projecting outside, and can prevent unfastening at either head or distal end of a bolt shank.

(Solution for the Problem)

The invention as claimed in claim 1 of the present invention is an unfastening prevention device attached to screwed up fastening means comprising:

a cap covering at least torque-receiving portion from axially one side of the fastened parts and being provided with a groove on its inner surface and a widened part on its inner surface close to its opening end of which inner diameter gradually increases as it goes to the opening end;

a spring means biased outwardly so as to engage its outer periphery into the groove formed on the inner surface of the cap, being able to slide along the inner surface of the cap except for the groove area and being able to decrease its diameter due to compression from outside by the widened part and a restriction means for the spring means axially restricting the spring means to move.

According to the first invention, the unfastening prevention device is attached to a fastening place screwed up by a bolt and nut and provided with cover (cap) means, spring means and restriction means. The cover means covers at least torque-receiving portion, and is provided with a groove on its inner surface in which groove outer periphery of the spring means is engaged. The restriction means locates in the fastening place and restricts axial movement of the spring means. When the spring means is restricted in the fastened parts, cover means is attached from one axial side, and the cover means are hammered, the spring means is decreased in its diameter, slides on the inner surface especially on widened part near open end of the cover means, then meets with the groove and its outer periphery is engaged in the groove. The cover means together with restriction means prevents axial movement of the cover means and a possible removal of the cover means from fastened parts. Since the cover means covers at least torque-receiving portion of the fastening means, it is impossible to give any torque on the fastening means by a general tool, resulting in perfect unfastening prevention. On the outer surface of the cover means, there is no need to provide any portion protruding outside at all. The restriction means may be composed as a groove on head of bolt or nut as well as on outer surface of spacers so as to be able to engage the inner periphery of the spring means. The spring means may be used as a washer adjusting its axial position by another washer(s) or/and spacer(s), and its outer periphery is engaged in the inner groove of the cover means.

Another invention 2 is characterized by that said cap means is or is not provided with plural holes penetrating from outer surface to the groove formed on the inner surface.

According to the second invention, since the holes penetrate from outer surface to the inner groove, pins of special tool pressed into the holes are able to press the spring means inwardly. Resulting from decrease in diameter of the spring means, the outer periphery of the spring means is forced out from the inner groove of the cover means, causing not to restrict axial movement of the cover means so as to release the cover means from the fastened parts. After the removal of the cover means form the fastened parts, getting loosen or adjusting the fastening rigidity by general tool become possible. When the cover means is removed from the fastened parts, it is possible to loosen or readjust fastening condition by common spanners or like tools. Also when all said holes are abolished, the cover may be called as a dead-lock fit type, which is suitable when the cover must not be unfastened by all means, and its manufacturing cost can be decreased.

Another invention 3 is characterized by that said unfastening prevention device comprising, first elastic body biasing whole inner surface of the spring means radial outwardly located inside of the spring means restricted by the restriction means.

According to the third invention, since the spring means is biased by the first elastic body radial outwardly at the position of restriction in the groove by the restriction means, the spring means is kept at a certain position and all the peripheral portion projects uniformly and coaxially. When the cover means is put, the inner surface of the cover means slides smoothly on the outer surface of the spring means and causes uniform decrease of the spring means diameter.

Another invention 4 is characterized by that said second elastic body disposed between the fastened parts and cap means, and compressed when the cap means is set.

According to the forth invention, in case a fastened part, e.g. a number plate vibrates, vibration and noise of cover means are prevented by the second elastic body, and when the cover means is released by special tool, the cover means is popped out automatically.

(Effects over Prior Arts)

As described above, according to the present invention (first to forth inventions), the cover means is attached to a fastened place screwed up by a bolt and nut and the cover means covers at least torque-receiving portion. The cover means is not provided with anything projected outwardly. The cover is provided with a groove on its inner surface in which groove outer periphery of the spring means is engaged. Since once cover means is attached, the axial movement of the cover means is restricted by the spring means, cover means is prevented removing from the fastening place. Due to the presence of the cover means, it is not possible to give unfastening torque using general tools resulting in unfastening prevention. The restriction means may be composed as a groove on head of bolt or nut as well as on outer surface of spacers so as to be able to engage the inner periphery of the spring means.

Further, according to the present invention, it is possible to release the cover means from the fastening place using holes formed on cover means and a special tool. After the removal of the cover means form the fastening place, getting loosen or adjusting the fastening rigidity become possible. Also when all said holes are abolished, the cover may be so called a dead-lock fit type, which is suitable when the cover must not be unfastened by all means, and its manufacturing cost can be decreased.

Further, according to the present invention, since the cover means is kept coaxial, it slides and is fitted smoothly.

Further, according to the present invention, in case a fastened part, e.g. a number plate vibrates, vibration and noise of cover means are prevented by the second elastic body, and when the cover means is released by special tool, the cover means is popped out automatically.

BEST MODE FOR CARRYING OUT THE INVENTION

Figure 1:
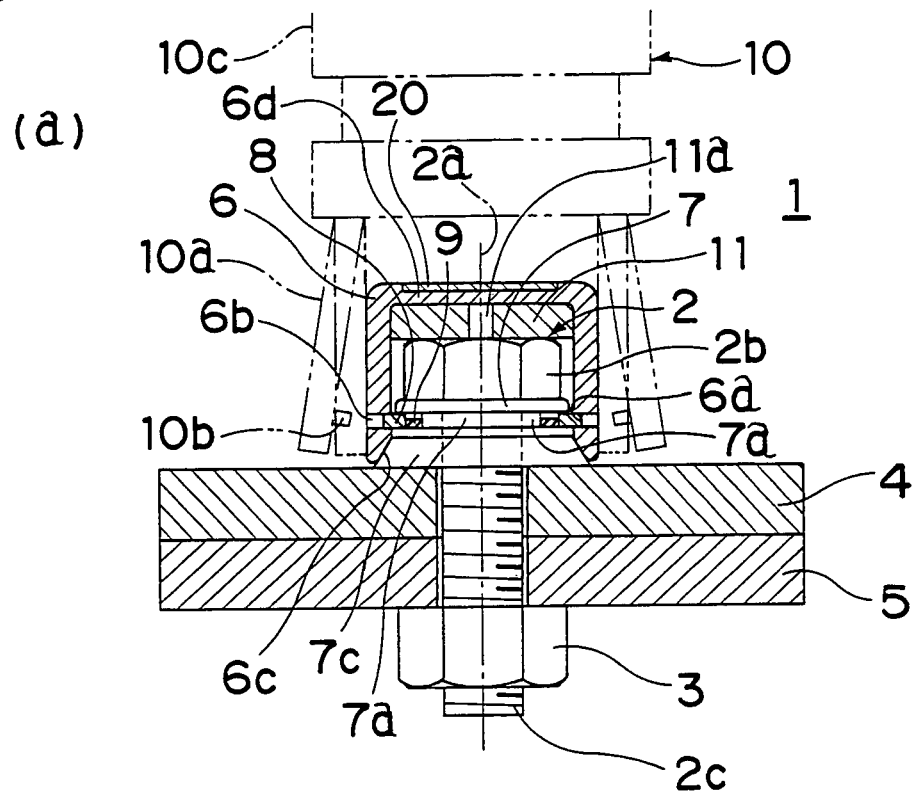
FIG. 1 is partially sectional vertical views showing first and second aspects of unfastening prevention devices according to the present invention.
Figure 1:
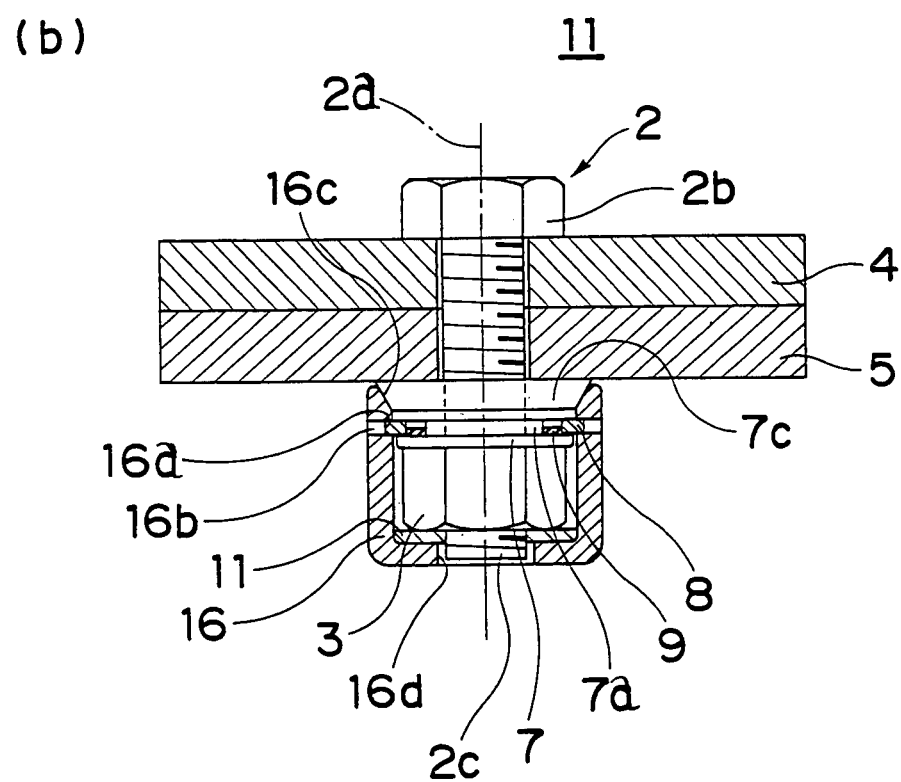

FIG. 1 shows schematic embodiments of unfastening prevention devices according to the present invention. FIG. 1(a) shows first aspect of the embodiment, and FIG. 1(b) shows second aspect. In the following drawings, like elements have like numbers and thereby eliminate duplicate explanations.

As shown in FIG. 1(a), in the unfastening prevention device 1 which is first aspect embodiment of present invention, a fastening means (place) for fastened parts 4, 5 is composed by a bolt 2 and a nut 3, and a cover element i.e. cap 6 covers a head 2b of the bolt 2 from one (upper) end of axle line 2a extending upper and lower directions of the bolt 2, i.e. from the side of proximal end of the bolt 2. Inner surface of the cap 6 (cover element or cover means) opens downwardly via a widened part 6c of which diameter increases as it goes down axially downwardly along the axle line 2a to its one (lower) end (the widened part 6 being a quasi taper slightly projecting inwardly in ark as shown in the drawing or in perfect taper), and is closed at another (upper) end forming a bottom 6d. From the bottom 6d, nothing projects outside (upper side) axially along the axle line 2a. Once the cap 6 is fixed, a spanner or other general tool can not be approached and be actuated to the fastening torque receiving part, i.e. at least to the head 2b of the bolt 2. The cap 6 in the drawing is provided with an annular groove 6a on the inner surface. Between an outer surface of the cap 6 and groove 6a, there are provided plural, for example four pin insertion holes 6b apart equal in circumferential direction. When cap 6 is fully covered on the fastening means, groove 6a of the cap 6 opposes to an annular groove 7a formed on an outer surface of a holder 7. The holder 7 is disposed between head 2b of the bolt 2 and an upper surface of the fastened part 4 as if it is a common metal washer, and is provided with a tapered part 7c which functions as an introducing guide to secure centering posture of the widened part 6c when the cap 6 is being attached. Between groove 6a of the cap 6 and groove 7a of the holder 7, there is a spring ring 8 (resilient material). Between an inner surface of the spring ring 8 and groove 7a of the holder 7, an elastic rubber ring 9 (first elastic body) is disposed.

In case of unfastening once attached cap 6 at an attaching factory, an exclusive special tool 10 is disposed as shown in FIG. 1(a), each pin 10b of four nail arms 10a is adjusted to enter the pin insertion hole 6b, diameter of the spring ring 8 is decreased by pins 10b from outside caused by turning a manipulation part 10c and the spring ring 8 is pushed out inside the groove 6a, thereby the cap 6 is automatically popped up by up to that time compressed elastic body 11 (second elastic body).

As shown in FIG. 1(b), unfastening prevention device 11 as second aspect embodiment of the present invention, a cap 16 is engaged from distal end 2c of the bolt 2 under the condition that holder 7 is disposed between lower surface of the fastened part 5 and nut 3. An inner surface of the cap 16 is provided with an annular groove 16a, and spring ring 8 is put between the groove 16a and groove 7a of the holder 7 to effect fastening of the cap 16, above which is the same as the embodiment of FIG. 1(a). Cap 16 is also provided with same pin insertion holes 16b as pin insertion holes 6b of the cap 6. A bottom of the cap 16 in this embodiment is provided with a bolt insertion hole 16d through which distal end 2c of the bolt 2 is inserted. Even when distal end 2c of the bolt 2 is entered in the bolt hole 16d, distal end 2c is designed not to protrude outside the hole along axle line 2a. When axial height of the cap 16 is increased, or distal end 2c of the bolt 2 is shortened, cap 6 shown in FIG. 1(a) which is not provided with bolt hole 16d may be used instead of cap 16. Reference numeral 16c is a widened part.

As shown in FIG. 1, when the caps 6, 16 are engaged on the fastening means, grooves 6a, 16a of the caps 6, 16 and groove 7a of the holder 7 are tightly connected by the spring ring 8, axial movement along axial line 2a of the caps 6, 16 are prevented thereby caps 6, 16 can not be taken out. Even when some torque around the axle line 2a is actuated outer surface of the caps 6, 16, slipping occurs between grooves 6a, 16a and outer surface of the spring ring 8 or between inner surface of the spring ring 8 and groove 7a of the holder 7, causing the caps 6, 16 run idle, and the torque is prevented to reach to the holder 7. If some torque is transmitted to the holder 7, it is not possible to transmit torque to head 2b of the bole 2 or nut 3, unfastening of the fastening means is effectively prevented. In the embodiments of FIG. 1, unfastening prevention is effected at one side, i.e. head 2b of the bolt 2 or distal end 2c, the unfastening prevention may be effected on both sides.

Figure 2:
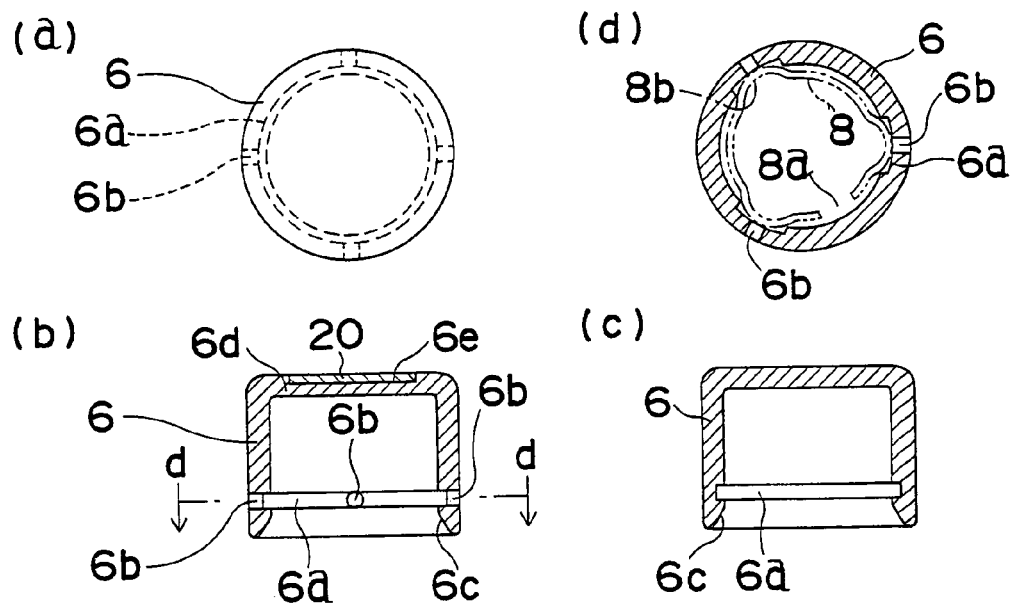
FIG. 2 shows a plan view and sectional vertical view of a cap of an embodiment of FIG. 1, a sectional vertical view of another embodiment corresponding to FIG. 2(b) and a sectional vertical view of another embodiment corresponding to d-d section of FIG. 2(b).
Figure 3:
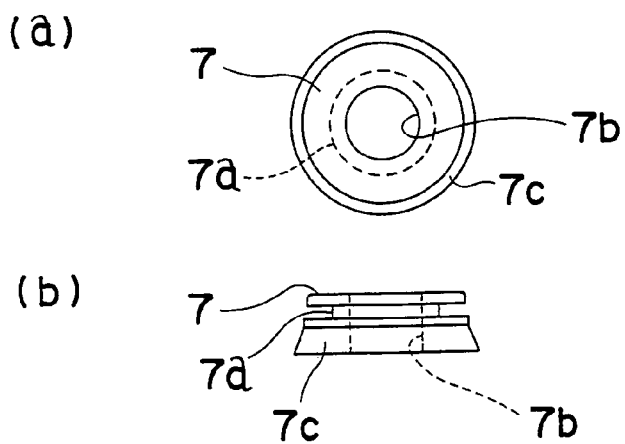
FIG. 3 shows a plan view and front view of a holder shown in the embodiment of FIG. 1.
Figure 4:
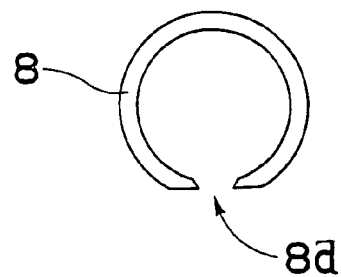
FIG. 4 is a plan view of a spring ring shown in the embodiment of FIG. 1.
Figure 5:
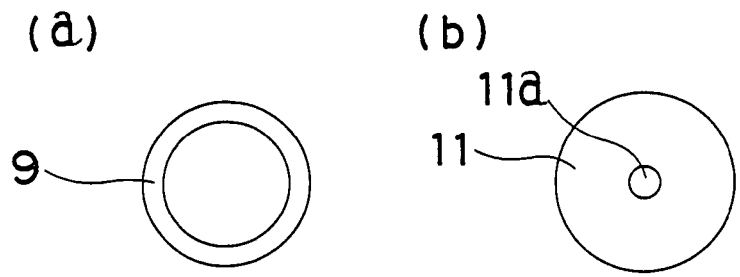
FIG. 5 shows plan views of rubber rings (first and second elastic bodies) in the embodiment of FIG. 1.

FIG. 2, FIG. 3, FIG. 4 and FIG. 5 show the cap 6, holder 7, spring ring 8 and rubber ring 9, elastic body 11 of FIG. 1(a) respectively. In FIG. 2 and FIG. 3, (a) shows plan view and (b) shows sectional elevation view. FIG. 4 and FIG. 5 show plan views.

As shown in FIGS. 2(a), 2(b), cap 6 is generally cylindrical and made of metal such as iron (ferrous material) and axially one side is open and other side is closed. In the inner surface close to the opening end, the annular groove 6a is formed. Plural pin insertion holes 6b are formed between the groove 6a and outer surface at regular circumferential intervals. The open end inner surface of the cap 6 is provided with a taper (widened part 6c) inner diameter of which increasing as it goes to the opening. In other words, since the inner diameter of the widened part 6c is largest at the open end, it is easily covered on the outer periphery of the spring ring 8 when the cap 6 is going to be covered. Under the condition that the outer periphery of the spring ring 8 is covered by the opening part (widened part 6c), when the bottom 6d is hammered, the widened part 6c slides on the outer periphery of the spring ring 8, then the outer diameter of the spring ring 8 is decreased and finally the spring ring 8 engages in the groove 6a. Outer periphery of the spring ring 8 engages in the groove 6a. When the spring ring 8 engages in the groove 6a, pins 10b (FIG. 1(a)) are pressed inside the pin insertion holes 6b against the outer surface of the spring ring 8 causing decrease of the diameter of the spring ring 8 and disengage the spring ring 8 from the groove 6a.

As shown in FIG. 2(c), the cap 6 has no holes like pin insertion holes 6b of FIG. 2(b) thereby making it as a complete lock up type. This lock up type is suitable for a fastening means which is obliged not to be unfastened by all means. This type is able to decrease the manufacturing cost as low as possible.

As shown in FIG. 2(b), outer surface (upper surface) of bottom 6d of the cap 6 is provided with a shallow recession 6e, round for example, in which recession 6e a seal 20 with for example logo mark is attached by means of both side adhesive tape. The seal is not able to be peeled off even using nails, so durability of the seal increases.

Although the groove 6a in FIG. 2(b) is annular, as shown in FIG. 2(d), intermittent grooves 6a with short circumferential length disposed annularly at regular intervals and a spring ring 8 made of piano wire with ark projections 8b engaged in the grooves 6a may be used.

As shown in FIG. 3, holder 7 is generally annular and made of metal such as iron. The holder 7 is provided with groove 7a on the outer surface, a central insertion hole 7b to be inserted by shank of the bolt 2, and tapered part 7c located at one end. Inner periphery of the spring ring 8 is engaged in the groove 7a. The spring ring 8 is designed to almost completely enter in the groove 7a when outer surface is compressed radially inwardly. Namely, groove 7a of the holder 7 functions as a restriction means to restrict the axial movement of the spring ring 8. When attachment of the cap 6 is completed, although widened part 6c of the cap 6 abuts or opposes with a small clearance left against the tapered part 7c, main object of the tapered part 7c is to stabilize the posture (keep centering position) of the cap 6 during the cap attaching procedure.

As shown in FIG. 4, spring ring 8 is made of metal plate such as iron plate annually, and is provided with an opening 8a, a cut part in circumference. Diameter of the spring ring 8 is shortened by compression from radially outward positions (for example from four positions at regular intervals). Upon releasing the compression force, the spring ring 8 returns to its free condition. By widening the interval of the opening, inner periphery of spring ring 8 may be engaged in groove 7a of the holder 7. Once engaged in the groove 7a, interval of the opening 8a returns to its free condition.

As shown in FIG. 5(a), rubber ring 9 is a sample of flexible ring made of elastic material. In the embodiments of FIG. 1(a) and FIG. 1(b), spring ring 8 is set after rubber ring 9 is set in groove 7a of the holder. According to the existence of rubber ring 9, spring ring 8 is set in an accurate center thereby equal radial amount of the outer peripheral portion of spring ring 8 is kept projecting. When spring ring 8 is compressed from outside and shrunk in diameter, rubber ring 9 is also compressed and shrunk, leaving room to spring ring 8 for deformation. Instead of rubber ring 9, other plastic elastomer ring may or may not be used.

As an example, rubber like elastic body 11 is provided with a central small hall 11a, fixed on an inner surface of cap bottom 6d by for example both sides adhesive tape (not shown), kept slightly (for example 0.8 mm) compressed condition after the completion of cap 6 mounting procedure, urging the cap 6 upwardly thereby eliminating clearance between spring ring 8 and holder 7 and also preventing chattering and noise caused by vibration of cap 6. If the elastic body 11 is made of soft silicon rubber, long and stable elasticity is secured. By selecting diameter of small hole 11a, reaction force from elastic body 11 to the set cap 6 is adjusted at most suitable value thereby improve manufacturing efficiency. Among alternatives of elastic body 11, thin wave annular spring or plural dish shaped springs piled by turns may be employed.

Figure 6:
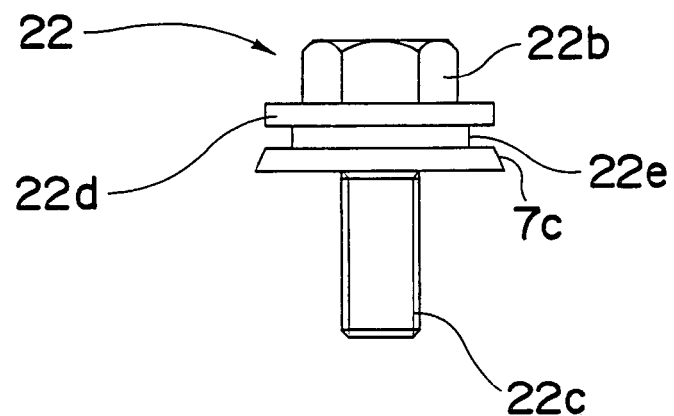
FIG. 6 is a front view of a bolt used in the 3rd embodiment of the present invention.

FIG. 6 shows a bolt 22 to be used in the third embodiment of the present invention. In this embodiment, bolt 22 is provided with a flange 22d in a head 22b integrally, and a groove 22e farmed around the flange 22d restricts spring ring 8 shown in FIG. 4. Namely, instead of using separate holder 7 of embodiment shown in FIG. 1, bolt 22 itself has a function of restricting means to restrict spring ring 8. In this kind of groove 22e of flange 22d, spring ring 8 is engaged, a nut is threaded on distal end 22c of the bolt 22, and cap 6 is attached on the bolt head 22b same as first embodiment shown in FIG. 1(a) to form unfastening prevention means.

Figure 7:
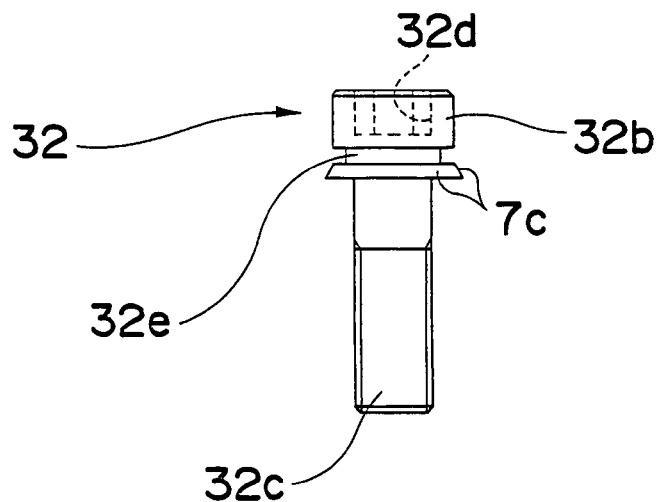
FIG. 7 is a front view of a bolt used in the 4th embodiment of the present invention.

FIG. 7 shows a bolt 32 used in fourth embodiment of this invention. Top surface center of head 32b of the bolt 32 is provided with, for example, a hexagonal hole 32d through which torque may be applied to fasten or loosen by a hexagonal rod wrench. In this embodiment, a groove 32e directly formed on outer surface of head 32d of the bolt 32 restricts spring ring 8 shown in FIG. 4. Namely, same as the embodiment of FIG. 6, instead of using separate holder 7 of embodiment shown in FIG. 1, bolt 32 itself functions to restrict spring ring 8 and a nut is threaded on distal end 32c of the bolt 32, thereby attaining unfastening prevention by attaching cap 6, same as first embodiment shown in FIG. 1(*a*).

Figure 8:
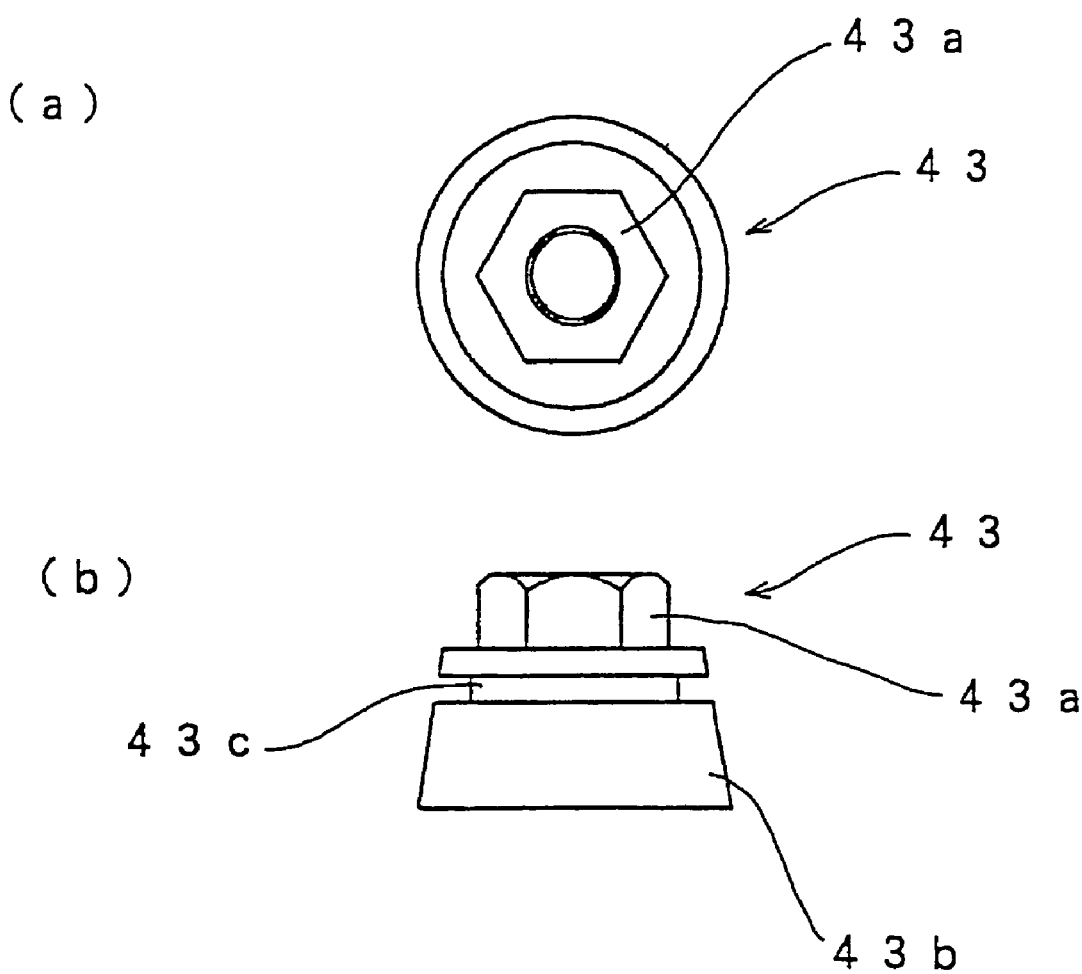
FIG. 8 shows a plan view and front view of a bolt in the 5th embodiment of the present invention.

FIG. 8 shows a nut 43 used for the fifth embodiment of this invention. The nut 43 of this embodiment comprises a head 43a and a hollow skirt 43b. Outer surface of the hollow skirt 43b is provided with a groove 43c, in which spring ring 8 shown in FIG. 4 is engaged. According to this construction, unfastening prevention is attained by covering the cap 16, same as second embodiment of FIG. 1(*b*). The idea of using nut as a restriction means can be utilized on the nut with flange by making a groove on the flange.

Although in above embodiments, parts with peripheral groove for receiving inner periphery of the spring ring 8 are used, a washer and a spacer may be piled to make an annular space corresponding to the groove.

INDUSTRIAL APPLICABILITY

The present invention is applicable using bolts and nuts etc. in mechanical fastening places such as fastening of number plate to bumper of automobiles, fastening of pole base plate to anchor nuts or anchor bolts, fastening in construction sites of iron towers or buildings and fastening parts to railroads or some structures.

The claimed invention is:

1. An unfastening prevention device attachable to a screwed up fastener, comprising:
    a cap covering at least a torque-receiving portion of the fastener axially from one side, the cap having a groove on an inner surface and a widened part on a portion of the inner surface close to an open end, an inner diameter of the widened part gradually as it goes toward the open end;
    a spring biased outwardly so as to engage an outer periphery thereof into the groove formed on the inner surface of the cap, the spring being able to slide along the inner surface of the cap except for an area of the groove and being able to decrease its diameter due to compression from outside by the widened part:
    a restriction device for the spring axially restricting movement of the spring; and
    a first elastic body located inside of the spring restricted by the restriction device, the first elastic body biasing an inner surface of the spring radially outward.

2. The unfastening prevention device as claimed in claim 1, wherein said cap is provided with plural holes penetrating from an outer surface to the groove formed on the inner surface.

3. The unfastening prevention device as claimed in claim 1 further comprising a second elastic body disposed between the fastener and the cap, the second elastic body being compressed when the cap is set.

\* \* \* \* \*